(No Model.)
J. M. KOEBERLE.
MEAT HOOK.
No. 367,302.  Patented July 26, 1887.
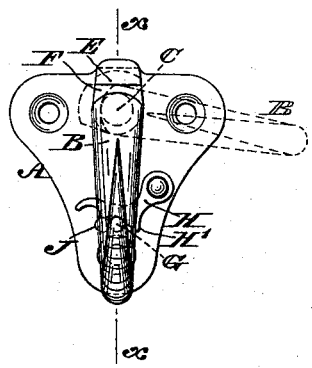
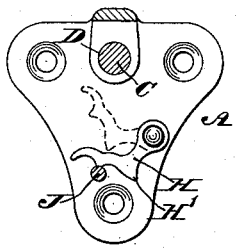
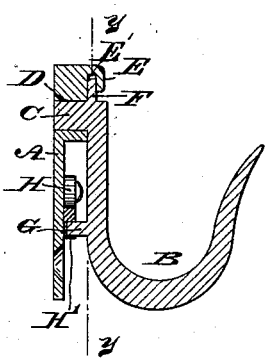
WITNESSES:
Jas. F. Kelly
L. Douville
INVENTOR:
John M. Koeberle
BY
ATTORNEY.

UNITED STATES PATENT OFFICE.

JOHN M. KOEBERLE, OF PHILADELPHIA, PENNSYLVANIA, ASSIGNOR TO THOMAS DEVLIN & CO., OF SAME PLACE.

MEAT-HOOK.

SPECIFICATION forming part of Letters Patent No. 367,302, dated July 26, 1887.

Application filed April 6, 1887. Serial No. 233,869. (No model.)

*To all whom it may concern:*

Be it known that I, JOHN M. KOEBERLE, a citizen of the United States, residing in the city and county of Philadelphia, State of Pennsylvania, have invented a new and useful Improvement in Meat-Hooks, which improvement is fully set forth in the following specification and accompanying drawings.

My invention consists of a meat-hook having a hook detachably connected with the back plate, the means employed for connecting the hook with said plate and locking the same being hereinafter fully set forth and definitely claimed.

Figure 1 represents a front view of a meat-hook embodying my invention. Fig. 2 represents a vertical section on the line $x$ $x$, Fig. 1. Fig. 3 represents a vertical section on the line $y$ $y$, Fig. 1.

Similar letters of reference indicate corresponding parts in the several figures.

Referring to the drawings, A represents the back plate, which is provided with openings for the screws or other means of securing said plate in position.

B represents the hook proper, the same being made separate from the plate A and having at its upper end a rearwardly-projecting journal, C, which is fitted in a socket, D, in the back plate, A. In the top of the plate A, at the front thereof, is a slot, E', forming an overhanging hook, E, and rising from the top of the rear of the hook B is a lug, F, which is adapted to enter said slot E'. Projecting from the rear of the hook B is a pin or stud, G, which engages with a gravitating latch, H, pivoted to the plate A, said latch being prevented from dropping below the proper place by a pin or stud, J, which projects forward from the back plate and acts as a stop for the latch, as will be most clearly seen in Fig. 3, and also a stop for the hook B, as seen in Fig. 2.

The hook is presented obliquely to the plate and the journal C fitted in the socket D. The hook is then rotated on its journal so as to assume an upright position, the lug F now entering the slot E'. The pin G rides under the latch H and raises the same until it clears the shoulder H' on the under side of said latch, when said latch drops and the side of the shoulder engages with said pin G, thus locking the latch, whereby rotation of the hook in reverse direction is prevented. The lug F of the hook B is engaged in the slot E' and prevented from outward displacement, and thus the hook is firmly connected with the back plate. The contact-faces of the hook E and lug F may be cam or wedge shaped, in order to cause firm engagement of said parts.

By raising the latch the hook B may be rotated, thus removing the lug F from the slot, after which said hook B may be readily disconnected from the back plate by withdrawing the journal C from the socket D.

Having thus described my invention, what I claim as new, and desire to secure by Letters Patent, is—

1. A meat-hook having a plate provided with a socket and a slot, forming an overhanging hook, and a hook formed with a journal which enters said socket and a lug which enters the slot, said parts being combined substantially as and for the purpose set forth.

2. A meat-hook consisting of a plate with slot forming an overhanging hook, a pivoted latch, and a hook with a lug adapted to enter the said slot and a pin adapted to be engaged by the said latch, substantially as described.

3. A hook with a journal, lug, and pin, in combination with a back plate having a socket and slot at the top, a latch, and stop-pin, substantially as described.

JOHN M. KOEBERLE.

Witnesses:
JOHN A. WIEDERSHEIM,
A. P. JENNINGS.